United States Patent [19]
Goldsmith

[11] 3,900,005

[45] Aug. 19, 1975

[54] MILKING MACHINE

[75] Inventor: Frank Edward Goldsmith, Cwmbran, England

[73] Assignee: Alfa-Laval AB, Tumba, Sweden

[22] Filed: May 21, 1974

[21] Appl. No.: 471,853

[30] Foreign Application Priority Data
May 21, 1973 United Kingdom............... 24118/73

[52] U.S. Cl. ............................................ 119/14.41
[51] Int. Cl. ................................................ A01j 5/04
[58] Field of Search........... 119/14.41, 14.08, 14.44, 119/14.29

[56] References Cited
UNITED STATES PATENTS
3,690,300   9/1972   Tonelli............................ 119/14.08

Primary Examiner—Louis G. Mancene
Assistant Examiner—Peter Skiff
Attorney, Agent, or Firm—Cyrus S. Hapgood

[57] ABSTRACT

A milking machine has teat cups each provided between the shell and the liner with a pulse space subjected alternately to atmospheric pressure and a vacuum to expand and contract the liner while the space within the liner is subjected to a milking vacuum. When the milk flow rate is below a certain level, a monitoring apparatus automatically regulates the flow of air from the pulse space to effect a gradual opening of the liner, to avoid the usual sudden opening.

3 Claims, 3 Drawing Figures

MILKING MACHINE

THE DISCLOSURE

This invention relates generally to milking machines.

Prior milking machines have teat cups, each of which cmprises a shell and a flexible liner, the pulse space between the shell and the liner being subjected alternately to atmospheric pressure and a vacuum to expand and contract the liner while the space within the liner is subjected to a milking vacuum. In this arrangement, the liner undergoes pulsing, while on a teat of the cow, to draw the milk from the teat under the milking vacuum, the milk being drawn through a milk pipe to a milk receiving vessel.

It has been found with such teat cups that when the vacuum is applied to the pulse space between the liner and the shell, there is an uncontrolled opening movement of the liner toward the shell, and this can cause a back-pressure in the milk pipe giving rise to an impact force on the end of the teat.

Recent research has indicated that such an impact force may be a cause of mechanical transfer of bacteria to the interior of the cow's teat which may result in mastitis infections. The risk of infection is greater when there is little or no milk flowing from the teat, i.e., at the beginning or end of a milking operation.

It has been proposed that the impact forces be reduced by fitting a deflector plate within the liner and below the teat.

In one form of the present invention, described in more detail below, there is provided a monitoring apparatus for use in milking machines, comprising means for regulating the flow of air from the pulse space of a teat cup to effect gradual opening of the liner. Preferably, the flow of air is regulated by suitable valve means in response to changes in the flow of milk as detected by a milk flow indicator, the air flow being regulated only when the milk flow rate is below a predetermined level.

A milking machine incorporating a monitoring apparatus in accordance with the invention will now be described, by way of example, with reference to the accompanying drawings in which.

Figure 1:
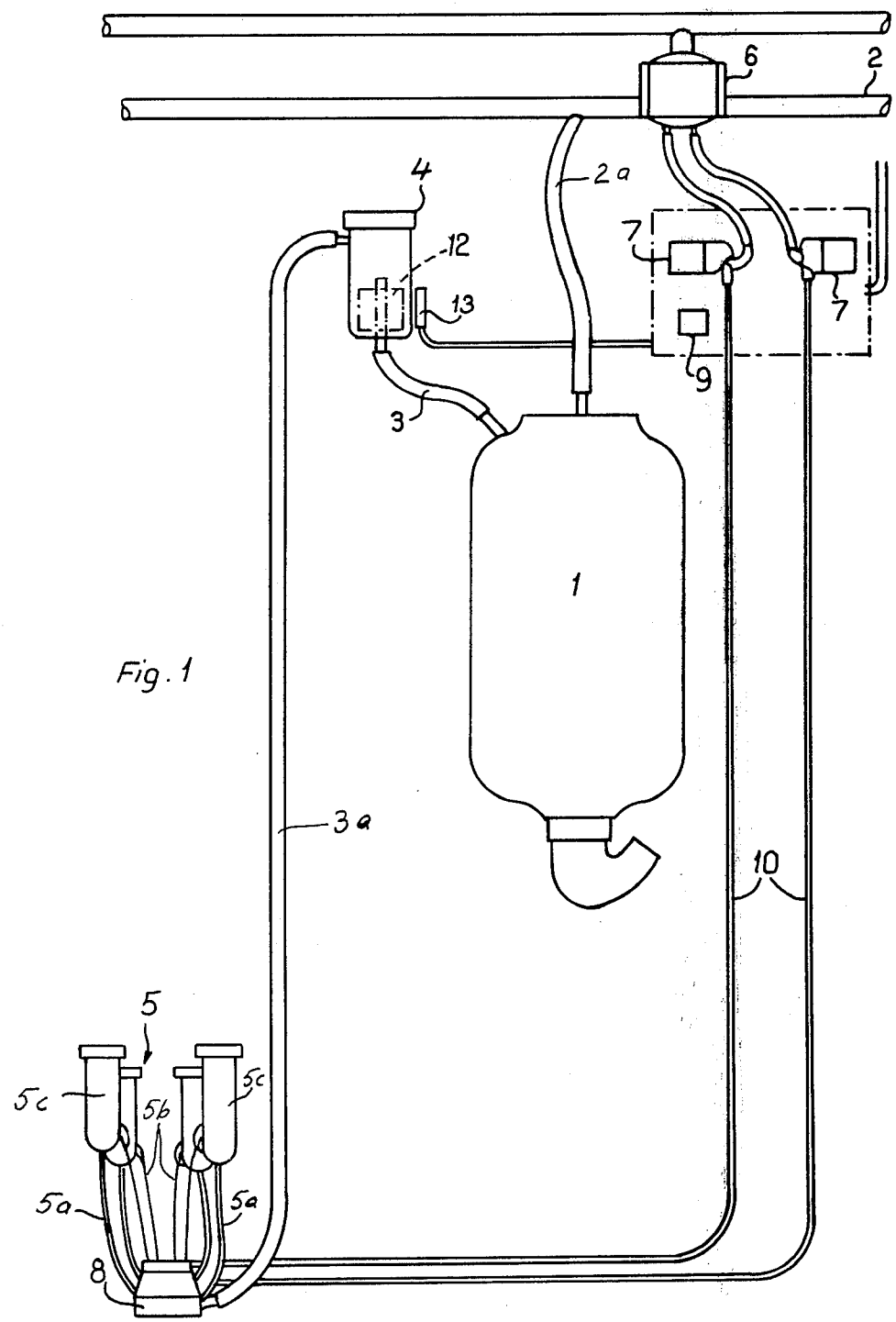
FIG. 1 is a schematic view of the milking machine.

Referring to FIG. 1, the milking machine comprises a milk-receiving vessel 1 connected through hose 2a to a sanitary vacuum milk line 2 and also connected through a milk supply line 3–3a and a teat-cup claw 8 to the milking vacuum spaces in a set of four teat cups 5. The teat cups 5 and claw 8 are of a conventional form well known in the art.

The claw 8 is connected pneumatically through a pair of ducts 10, each associated with a respective pair of teat cups, to a conventional pulsator 6 which pulses each pair of teat cups in turn.

The monitoring apparatus comprises a milk flow indicator 4 connected in the milk supply line 3–3a. The indicator 4 has a switching arrangement comprising a float 12 and reed switch 13 electrically connected to a relay 9. The relay 9 is operable by the reed switch to energize and thereby actuate a pair of solenoid valves 7 from an electrical supply source (not shown). The valves 7 are connected in the respective ducts 10 between the pulsator 6 and claw 8.

Figure 2:
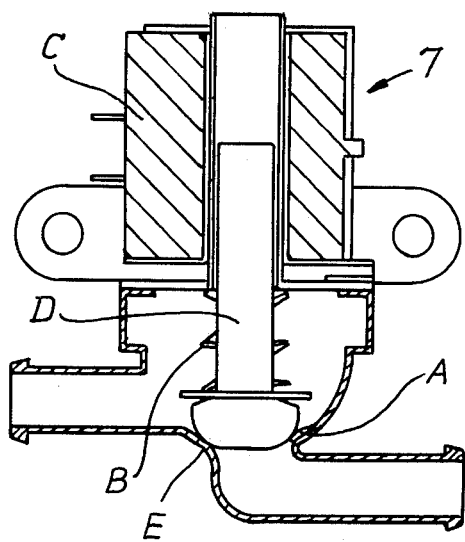
FIG. 2 is a vertical sectional view of a regulating valve forming part of the monitoring apparatus.

Referring to FIG. 2, each valve 7 comprises a valve member D biased by a coil compression spring B toward a valve seat E and controlled by a solenoid C. The spring B has a force which is just sufficient to move the valve member D to its closed position when the solenoid C is not energized, i.e., to the position shown in FIG. 2. The valve seat E (or alternatively the valve member D) has a bleed groove A which allows a restricted passage of air to pass through the valve even when the valve is closed.

When the teat cups are first applied to the cow, no milk flows through the supply line 3a-3, and the reed switch 13 cuts off the electrical supply to the valves 7 so that the valves are closed.

Considering one of the pair of ducts 10 and its associated pair of teat cups, during the vacuum phase of the pulsation cycle air is withdrawn from the pulse spaces of the teat cups and passes via the corresponding duct 10 through the bleed groove A of the associated valve 7, which restricts the air flow and thus allows the liners to open only gradually so that they open fully just when the pulsator 6 changes to the air phase. Since the liners do not open quickly, there is no back pressure developed in the vacuum milking spaces of the teat cups and the teats are not subjected to impact forces.

With ratio milking (i.e., when the air phase is longer than the vacuum phase), if the same restriction of air flow were applied to the air phase as to the vacuum phase, then the liners would not fully close before the pulsator changed back to the vacuum phase. To ensure that the liners close during the air phase, the force of spring B is chosen so that the air pressure opens the valve 7 to permit a less restricted flow of air during the air phase.

When the milk flow through line 3a-3 reaches a predetermined rate, the float 12 of indicator 4 is raised sufficiently to actuate reed switch 13, whereby the latter operates through relay 9 to electrically energize the valves 7. The latter are thus opened to allow normal unrestricted pulsation action. As the milk flow diminishes at the end of the milking operation, the reed switch 13 is float-actuated to cut off the electrical supply to the valves 7 when the flow falls below the predetermined rate, so that these valves are again closed to slow the opening movements of the liners during the pulsation cycle.

Figure 3:
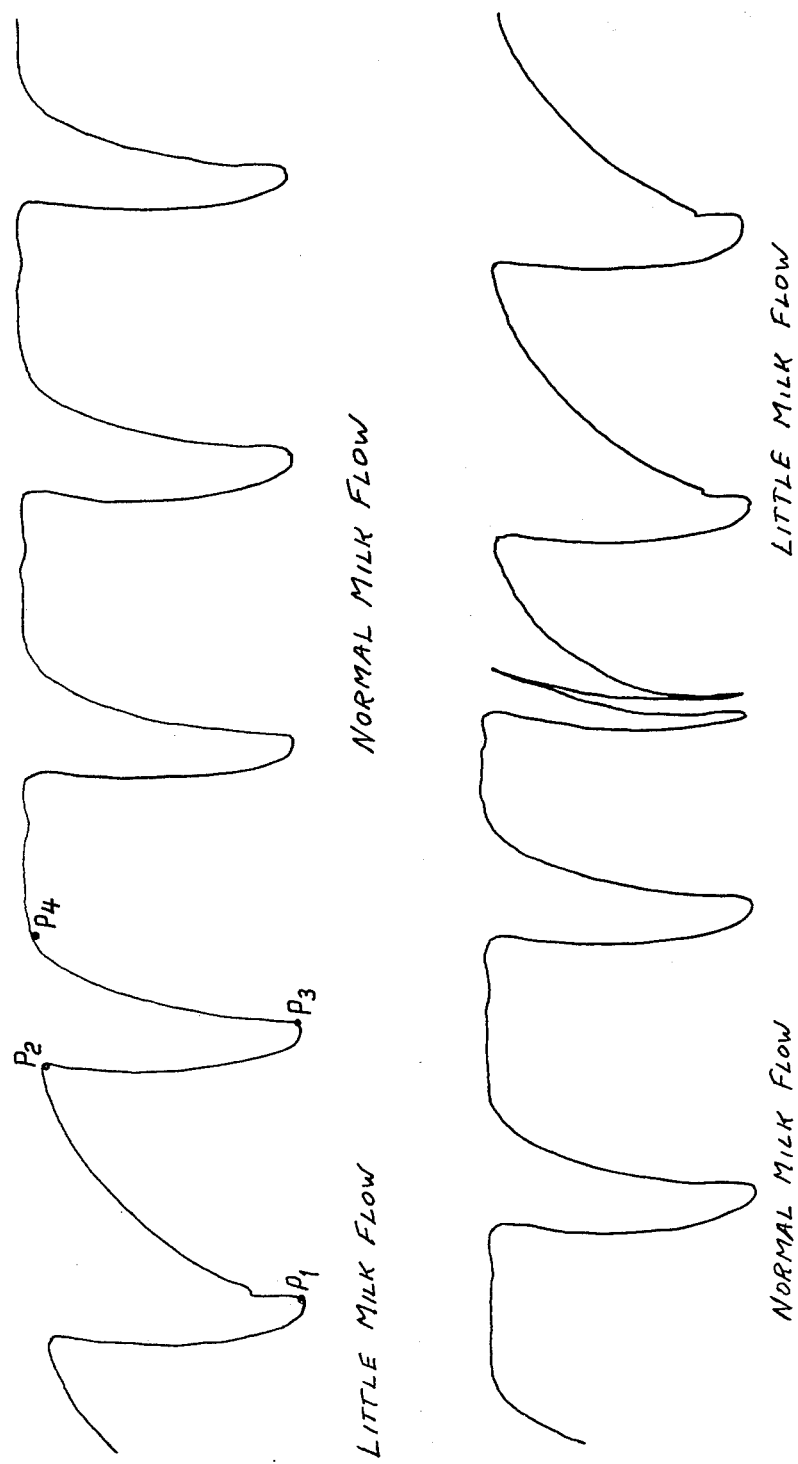
FIG. 3 is a graph pressure changes in the pulse space of a teat cup of the milking machine.

FIG. 3 shows clearly the pressure changes in the teat cup pulse spaces during a normal milking operation using the above-described machine. When the milk flow is below the predetermined rate and the valves are closed, during the vacuum phase the pressure decreased gradually from atmospheric at point $P_1$ to a lower pressure $P_2$ so that the liner opens gradually and is only fully open when the vacuum pressure, say 380 mm of Hg, is attained. The pulsator 6 then changes to the air phase and there is a sudden increase of pressure to atmospheric at point $P_3$. By this time the milk flow has increased to a level above the predetermined rate and the reed switch 13 has operated to open the valves to allow normal unrestricted pulsation. At the next vacuum phase the pressure in the pulse space decreases rapidly from point $P_3$ to $P_4$. As can be seen, the operation is similar at the end of the milking operation.

It will be appreciated that where all four teat cups are pulsing together, and not in pairs as in the above-described machine, only one solenoid valve 7 is required. Further, the valves may be pneumatically or hydraulically operated instead of electrically.

With machines operating on a large milking-to-rest ratio, a three-way valve may be used to regulate the flow of air into the pulse spaces in addition to regulating the flow of air from the spaces.

Other variations are possible within the scope of the invention. For example, a deflector may be inserted within the liner below the teat as a further safeguard against impact forces, and means for effecting changes in the vacuum level and for the milking-to-rest ratio, as are already known, may be incorporated in the above-described machine.

As will be readily understood by those skilled in the art, the milking vacuum maintained in vessel 1 draws milk from the teats through the liner extensions 5a of the teat cups and thence through claw 8 and supply line 3a-3 into the vessel 1; and the pneumatic pulsations from pulsator 6 are transmitted through valves 7, ducts 10 and claw 8 to the pulse spaces of the teat cups via tubes 5b. The shells of the teat cups are shown at 5c.

I claim:

1. A milking machine including teat cups each having a shell and a liner, the pulse space between the shell and the liner being subjected alternately to atmospheric pressure and a vacuum to expand and contract the liner while the space within the liner is subjected to a milking vacuum, a milk flow indicator associated with the teat cups for detecting changes in the flow rate of milk from the teat cups, and means operable in response to changes in the flow rate of milk as detected by said indicator for regulating the flow of air from the pulse space to effect gradual opening of the liner when the milk flow rate is below a predetermined level, said regulating means comprising a solenoid valve having a valve seat, a valve member, resilient means biasing the valve member toward the valve seat to close the valve, and a solenoid operable to open the valve against the action of said resilient means when the milk flow rate exceeds said predetermined level, the force of said resilient means being sufficient to move said valve member to its closed position when said solenoid is deenergized.

2. The milking machine of claim 1, in which one of said valve member and valve seat has a bleed groove which allows a restricted passage of air through the valve when the valve is closed.

3. The milking machine of claim 2, in which the valve member is actuatable by said resilient means to close the valve when air is flowing from the pulse spaces of the teat cups, said resilient means allowing the valve to open when air is flowing in the opposite direction to provide a generally unrestricted flow of air to said pulse spaces even when the solenoid is not energized.

* * * * *